(12) United States Patent
van Bennekom et al.

(10) Patent No.: US 11,400,511 B2
(45) Date of Patent: Aug. 2, 2022

(54) METHOD FOR PRODUCING A COMPONENT HAVING A CORE PORTION WHICH CONSISTS OF STEEL

(71) Applicant: Deutsche Edelstahlwerke Specialty Steel GmbH & Co. KG, Witten (DE)

(72) Inventors: André van Bennekom, Ainring (DE); Horst Hill, Grefrath (DE)

(73) Assignee: Deutsche Edelstahlwerke Specialty Steel GmbH & Co., Witten (DE)

( * ) Notice: Subject to any disclaimer, the term of this patent is extended or adjusted under 35 U.S.C. 154(b) by 752 days.

(21) Appl. No.: 15/757,505

(22) PCT Filed: Aug. 31, 2016

(86) PCT No.: PCT/EP2016/070445
§ 371 (c)(1),
(2) Date: Mar. 5, 2018

(87) PCT Pub. No.: WO2017/042060
PCT Pub. Date: Mar. 16, 2017

(65) Prior Publication Data
US 2018/0243815 A1    Aug. 30, 2018

(30) Foreign Application Priority Data
Sep. 8, 2015 (DE) ...................... 10 2015 115 061.1
Dec. 18, 2015 (EP) ...................... 15201021

(51) Int. Cl.
*B21J 5/00* (2006.01)
*B21B 27/03* (2006.01)
(Continued)

(52) U.S. Cl.
CPC ............ *B21J 5/002* (2013.01); *B21B 27/032* (2013.01); *B21K 1/06* (2013.01); *B21K 1/10* (2013.01);
(Continued)

(58) Field of Classification Search
CPC ... B21J 5/002; B21K 1/02; B21K 1/06; B21K 1/10; B22F 3/15; B22F 3/17; B22F 7/08; B23K 9/048; B21D 31/00
See application file for complete search history.

(56) References Cited

U.S. PATENT DOCUMENTS 4,484,959 A    11/1984 Boucher et al.
4,697,320 A    10/1987 Ishihara et al.
(Continued)

FOREIGN PATENT DOCUMENTS

CN    202667247 U    1/2013
CN    103624084 A    3/2014
(Continued)

OTHER PUBLICATIONS

Wegst et al.,"Key to Steel", 2010 Edition, Verlag Stahlschlussel Wegst GmbH, Theodor-Heuss-Strasse, Germany.

*Primary Examiner* — Debra M Sullivan
(74) *Attorney, Agent, or Firm* — The Webb Law Firm

(57) ABSTRACT

A method for simply producing components suitable for use under high loads and risks of wear and which have a core portion which consists of a metal material and a wear-resistant layer on a peripheral surface of the core portion is disclosed. A core portion blank is provided and consists of the metal material whose dimension in a first spatial direction is greater than the desired finished dimension of the core and whose second dimension is smaller than the desired finished dimension is provided. A material that forms a wear-resistant layer in the component is applied to a peripheral surface of the core portion blank. The composite body is shaped to form the component. The component may then be optionally finished.

10 Claims, 4 Drawing Sheets

(51) Int. Cl.

| | | |
|---|---|---|
| *B22F 7/08* | (2006.01) | |
| *B22F 3/15* | (2006.01) | |
| *B22F 3/17* | (2006.01) | |
| *B23K 10/02* | (2006.01) | |
| *B21K 1/06* | (2006.01) | |
| *B23P 15/00* | (2006.01) | |
| *B21K 5/00* | (2006.01) | |
| *B21K 1/12* | (2006.01) | |
| *B29C 48/505* | (2019.01) | |
| *B21K 1/10* | (2006.01) | |
| B23K 101/06 | (2006.01) | |
| B23K 103/04 | (2006.01) | |
| B22F 5/00 | (2006.01) | |
| B22F 3/24 | (2006.01) | |
| B29C 48/03 | (2019.01) | |

(52) U.S. Cl.
CPC .................. *B21K 1/12* (2013.01); *B21K 5/00* (2013.01); *B22F 3/15* (2013.01); *B22F 3/17* (2013.01); *B22F 7/08* (2013.01); *B23K 10/027* (2013.01); *B23P 15/00* (2013.01); *B29C 48/507* (2019.02); *B22F 3/24* (2013.01); *B22F 2005/002* (2013.01); *B22F 2998/10* (2013.01); *B23K 2101/06* (2018.08); *B23K 2103/04* (2018.08); *B29C 48/03* (2019.02)

(56) References Cited

U.S. PATENT DOCUMENTS

| | | | |
|---|---|---|---|
| 4,966,748 | A | 10/1990 | Miyasaka et al. |
| 6,206,814 | B1 | 3/2001 | Tanaka et al. |
| 9,592,553 | B2 * | 3/2017 | Berglund .................. B22F 3/15 |
| 9,782,809 | B2 | 10/2017 | Steinhoff et al. |
| 2004/0040358 | A1 | 3/2004 | Seidel et al. |
| 2005/0050709 | A1 | 3/2005 | Liimatainen |
| 2011/0195270 | A1 | 8/2011 | De Souza et al. |
| 2012/0175076 | A1 | 7/2012 | Seidel et al. |
| 2014/0037979 | A1 | 2/2014 | Cacace |
| 2015/0089987 | A1 * | 4/2015 | Inoue ........................ B22F 3/15 72/199 |

FOREIGN PATENT DOCUMENTS

| | | |
|---|---|---|
| DE | 955240 E3 | 1/1957 |
| DE | 102009037278 A1 | 2/2011 |
| EP | 0388968 A2 | 9/1990 |
| EP | 1365869 B1 | 10/2004 |
| EP | 1512484 A1 | 3/2005 |
| GB | 475712 A | 11/1937 |
| JP | 62148004 A | 7/1987 |
| JP | 645611 A | 1/1989 |
| JP | 459901 A | 2/1992 |
| WO | 2014001024 A1 | 1/2014 |
| WO | 2015197466 A1 | 12/2015 |

* cited by examiner

METHOD FOR PRODUCING A COMPONENT HAVING A CORE PORTION WHICH CONSISTS OF STEEL

CROSS-REFERENCE TO RELATED APPLICATIONS

This application is the United States national phase of International Application No. PCT/EP2016/070445 filed Aug. 31, 2016, and claims priority to German Patent Application No. 10 2015 115 061.1 and European Patent Application No. 15201021.1 filed Sep. 8, 2015, and Dec. 18, 2015, respectively, the disclosures of which are hereby incorporated in their entirety by reference.

BACKGROUND OF THE INVENTION

The invention relates to a method for producing a component, wherein the component has a core portion which consists of a metal material, in particular a steel, and a wear-resistant layer which is carried by the core portion and which is present on a peripheral surface of the core portion.

The invention particularly relates to a method for producing a rotationally symmetrically formed component, at the periphery of which the wear-resistant layer is formed.

A typical example of such a component is a roller for hot-rolling or cold-rolling flat metal products which are typically strips, sheets or blanks which are obtained therefrom and which consists of steel or non-ferrous metal. Depending on the applications, the rollers reach dimensions of the bale diameter of up to 1 m and lengths of up to 10 m.

Other examples of areas of application of components of the type in question here are the paper, glass and wood industry and the plastics processing industry, where a significant abrasive wear loading of the tools used can occur in particular during processing of fibre-reinforced plastic materials.

Components of the type which are intended to be produced according to the invention are consequently in practice, typically in the region of a peripheral surface, which comes during practical use into contact with another component or the product which, respectively, is intended to be processed, subjected to high pressure or friction loads and where applicable also corrosion. In order to prevent excessive wear which is otherwise initiated thereby, the relevant contact surface is formed on the outside of the wear-resistant layer.

In order to increase the service-lives of working rollers which are used during hot-rolling of hot steel strip, it has been proposed in DE 10 2009 037 278 A1 to provide a working roller which is used in a rack for the finishing hot-rolling of hot strip which consists of steel with a wear-resistant layer which is intended to be produced from powder-metallurgical material by hot isostatic pressing, also referred to for short as "HIP" in technical language.

A comparable proposal appears in EP 1 365 869 B1, according to which a working roller which is used for hot-rolling is also provided with a layer which is applied by the HIP method in order to increase the wear-resistance thereof.

During the production of such working rollers, a base body, which consists of cast iron or a suitable steel and which comprises a bale region which comes into contact with the roller product during use and bearing journals which are formed thereon and via which the roller is supported in the respective roll rack, is initially produced by casting or forging. In this instance, the material of the base body has mechanical properties which are optimally adapted to the force loads which occur during practical use.

The base body which is prefabricated in this manner is then surrounded with a sheet metal capsule. This has such dimensions that there is formed a cavity which extends round the base body between the inner peripheral surface thereof and the peripheral surface of the bale. This cavity is filled with an alloy powder. Subsequently, the sheet metal capsule is closed in a gas-tight manner. Subsequently, the densification is carried out under high pressure which is effective at all sides and at a high temperature. In this case, the pressure and temperature are adjusted so that the powder becomes densified and sintered. In this manner, a completely dense layer, in which the individual powder grains are sintered not only with each other but also with the base body, is produced on the base body so that a homogeneous composite body is produced. After the end of the hot isostatic pressing, the sheet metal capsule is removed. Finally, a thermal subsequent processing can be carried out in order to impart to the composite roller obtained the required mechanical properties. Generally, a mechanical final processing is also carried out in order to ensure the required dimensional stability.

Another proposal for forming a wear-resistant layer on a steel core of a roller for the cold-rolling of steel sheets is described in U.S. Pat. No. 6,206,814. In the method set out therein, a casing comprising highly wear-resistant material is formed around a cylindrical core portion which consists of the steel SCM440 (EN material number 1.7223) as a result of composite casting.

In U.S. Pat. No. 4,484,959, it has been suggested as another alternative to the above-explained production methods to produce a component in which a core portion must have properties other than a layer which surrounds the core portion in that the peripheral layer which consists of a high-speed steel containing Cr and W is applied to the core portion which consists of a weakly alloyed construction steel by means of deposition welding. In this manner, in particular working rollers for cold-rolling are intended to be able to be retrofitted so that they reliably comply with the requirements placed on the service-life thereof.

In modern roller lines, increasingly higher requirements are placed on the width of the processed roller material. Accordingly, increasingly longer rollers have to be made available in order to be able to roll greater widths in an operationally reliable manner. In this instance, it has been found to be problematic that, for example, the effort connected with the coating of such long rollers using the HIP method is considerable. Thus, the equipment-related effort required for the hot isostatic pressing increases in a disproportionate manner with the increasing length of the rollers. HIP apparatuses which are available nowadays are therefore limited in terms of the length thereof so that rollers which have dimensions which are adapted to the current requirements of the operators of roller lines can no longer be processed therewith.

In WO 2014/001024 A1, it has been proposed in order to solve this problem initially to produce for producing rollers for cold-rolling or hot-rolling flat metal products a base body which extends only over the bale region of the roller to be produced, then to cover this base body with a wear-resistant layer by means of hot isostatic pressing and only afterwards to weld to the base body the journals which are required for the rotatable support of the rollers in the roll rack. Since the journals are connected to the base body according to this proposal only after the hot isostatic pressing, the HIP apparatuses which are available can be used over the complete length thereof for the HIP coating of the bale region, whereas during conventional methods not only the bale region but also the journals which are already formed on the bale region of the base body have to be accommodated in the HIP apparatus.

Against the background of the above-explained prior art, there has been produced the requirement for providing a method which allows the simple production of components which are particularly suitable for use under high loads and consequently with high risks of wear as a result of the property profile thereof. In particular, the invention should allow the production of components which have a substantial length, such as, for example, rollers for hot-rolling or cold-rolling of flat metal products or machine components which are used in the field of plastics processing.

BRIEF SUMMARY OF THE INVENTION

The invention has solved this problem by the method set out in the present disclosure.

Advantageous embodiments of the invention are set out in the dependent claims and are explained in detail below, as is the general inventive notion.

The method according to the invention for producing a component which has a core portion which consists of a metal material, in particular a steel, and a wear-resistant layer which is carried by the core portion and which is present on a peripheral surface of the core portion, consequently comprises the following operating steps:
a) providing a core portion blank which consists of the metal material and whose dimension in a first spatial direction is greater than the desired finished dimension of the core portion of the component in the relevant spatial direction and whose dimension in a second spatial direction is smaller than the desired finished dimension of the core portion of the component in this second spatial direction;
b) applying a material which forms the wear-resistant layer in the finished component to the peripheral surface of the core portion blank in such a manner that the applied material and the core portion blank form a stable composite body;
c) shaping the composite body to form the component, wherein the composite body during the shaping is extended in the direction of the second spatial direction and is compressed in the direction of the first spatial direction until the dimensions of the composite body in the spatial directions at least correspond to the desired finished dimensions of the component in these spatial directions, wherein the material which forms the wear-resistant layer is present on a peripheral surface of the component;
d) optional finishing processing of the component.

Consequently, the invention is based on the notion, starting from a core portion blank which is easier to handle as a result of the form thereof which is compact in comparison with the finished component which is intended to be produced and in which the extents in the different spatial directions differ from each other in an optimum manner only to a limited extent, of forming the finished component by means of shaping, namely after the material which forms the wear-resistant layer of the finished component has been applied to the core portion blank. (The term "spatial directions" is intended in the present text to be understood to refer to the three spatial directions which are orientated orthogonally to each other of a Cartesian coordinate system.)

The material of the wear-resistant layer and the base body are consequently shaped together in the method according to the invention until the finished component is present at least in the basic shape thereof and subsequently can be processed, if still necessary, to a finished state.

In the operating step a), there is provided to this end a core portion blank from which the core portion of the component which is intended to be produced is formed during the subsequent shaping.

If the component which is intended to be produced is a roller, the core portion blank can be produced in the manner conventional in practice during the production of rollers, for example, from cast steel or cast iron. Steels which are suitable for this purpose are typically soft steels with a high level of toughness.

Accordingly, construction steels are generally suitable for the core portion blank, in particular ones which have a high level of toughness.

However, all steels having a sufficient level of wear-resistance are suitable for the wear-resistant layer, in particular ones which can be processed in powder form. These typically include commercially available cold work steels and high-speed steels with a corresponding property profile.

A particularly important case in practice is the production of a rotationally symmetrical component. In this case, the material volume of the core portion blank, which is also cylindrically formed in an optimum manner, corresponds at least to the material volume of the core portion of the component which is intended to be produced.

The term "at least" is intended in this context to be understood to mean that the material volume of the core portion blank will in practice always be greater by a specific overdimension than the material volume of the core portion of the finished component in order to compensate for material loss during the finishing processing of the component which is generally carried out in a machining manner (operating step d)).

In the event that the component which is intended to be produced according to the invention is a roller having journals which are formed on the end sides thereof, the material volume of the core portion blank also comprises the volume which relates to the journals which are intended to be formed on the core portion if they are intended to be formed from the material of the core portion blank. Alternatively to a technical shaping production from the material of the core portion blank, it is also naturally conceivable to apply the journals to the core portion subsequently in a manner known per se. To this end, the journals which consist of a suitable material can be, for example, welded to the respective end side of the core portion or connected in a connection which acts mechanically.

It is decisive for the invention that the core portion blank is shorter with respect to a spatial direction than the dimension which the core portion of the finished component has in this spatial direction and that the core portion blank at the same time is greater with respect to another spatial direction than the dimension which the core portion of the finished component has in this other spatial direction.

If the component which is intended to be produced is a rotationally symmetrical component of great length measured along the central longitudinal axis thereof, such as, for example, a roller for a roller mill or a barrel extruder for processing plastics materials, the length of the core portion blank is accordingly substantially shorter than the length of the Finished component. At the same time, in this case the diameter of the core portion blank is correspondingly greater than the diameter of the finished component in order to ensure the necessary volume consistency.

Since the core portion blank provided according to the invention is not extended in any spatial direction in an extreme manner, conventional devices which are usually provided for this purpose can be used in the case of a procedure according to the invention for applying the material which forms the wear-resistant layer (operating step b)).

Should, for example, the material of the wear-resistant layer be applied by using the HIP method to the core portion blank and securely connected thereto, there can be used to this end in particular HIP devices which are available in practice and which can be operated efficiently, and the length of which is actually too short to produce components having the extreme lengths which are required nowadays using hot isostatic pressing. The procedure according to the invention results in this instance in a considerable reduction of the effort for the production of the capsule which is unavoidable in the HIP method because the possibly complex form of the finished component does not have to be reproduced, but instead the simple form of the compact core portion blank.

In the event that the material which forms the wear-resistant layer is intended to be applied to the respective peripheral surface of the core portion blank by deposition welding, conventional devices can also be used to this end with a longitudinal extent which is conventional nowadays.

In the operating step c), the composite body which is obtained after the operating step b) and which is formed from the core portion blank and the wear-resistant layer which is applied thereto and which is securely connected thereto is shaped to form the component. The shaping is carried out in this case so that the composite body is extended in the spatial direction in which it is shorter than the finished component, whereas it is compressed in the other spatial direction in which it is greater than the finished component. In particular forging is suitable for the shaping.

During the shaping process, not only does the composite body obtain the shape of the component which is intended to be produced but there is produced a grain refining and extension as a result of the deformation itself, the heating which is necessary where applicable for this, the extension of the composite body and the associated forces, whereby the properties of use, in particular of the core portion of the finished component, are optimised and negative influences of non-metal inclusions which are present in the core portion blank are reduced. If an HIP process has been carried out to apply the wear-resistant material to the base body, the shaping process can be controlled in such a manner that the changes of the structure of the structure blank which occur in the case of the HIPen as a result of the long-term heating necessary therein are eliminated.

Should there be present on the component peripheral surface portions which are free of the wear-resistant material, such as, for example, in the case of bearing journals which are produced in a technical shaping manner, the peripheral surface thereof, this can be achieved either in that the relevant regions are kept free in the operating step b) of the application of the wear-resistant material or in that the wear-resistant material is removed again subsequently from the relevant portion of the peripheral surface during the optional finishing processing operation of the component. During the HIP process, a recess of specific surface portions of the periphery of the core portion blank can be produced in that the capsule which surrounds the core portion blank abuts the periphery of the core portion blank closely at that location. If, however, the wear-resistant material is applied to the periphery of the core portion blank by deposition welding, the deposition welding operation can be interrupted in the region of the relevant portions. In the event that the component which is intended to be produced is a roller for hot-rolling or cold-rolling metal strips and a journal which is orientated coaxially relative to the core portion is formed on the end sides of the core portion thereof, respectively, it may accordingly be advantageous for this purpose if, during the application of the material which forms the wear-resistant layer (operating step b)), recessing is carried out over a length which is measured axially parallel with the longitudinal axis of the journals, which are intended to be formed from the end side of the core portion blank, and which has such dimensions that the volume of the base body end portion over which the recessed length of the peripheral surface extends corresponds to at least the volume of the journal which is intended to be formed on the respective end side of the finished roller.

In principle, it is conceivable to carry out the shaping (operating step c)) of the composite body so that the dimensions of the component which is obtained after the operating step c) comply with the required finished dimensions. In practice, however, an optimised production accuracy will be able to be achieved in that the shaping of the composite body is carried out in the operating step c) in such a manner that the component has after the operating step c) In at least one spatial direction an overdimension with respect to the desired finished dimension of the component in this spatial direction, and in that the component is finished being processed in the operating step d) by a machining processing operation so that the dimension thereof in the relevant spatial direction corresponds to the desired finished dimension.

Naturally, other operating steps can be carried out between the operating steps a) to d) or after the operating step d) if it is advantageous for the optimisation of the properties of the component which is intended to be produced. This includes, for example, the possibility of a concluding thermal processing operation for improving the mechanical properties of the component as a whole or individual portions thereof. Thus, in the event that the component is a roller, the journals or the central bale region which is present between the journals can be subjected to a thermal processing operation which includes an austenitisation and annealing, and can be processed mechanically by means of machining processing methods in order to comply with the requirements placed on surface quality and dimensional stability. This naturally applies respectively to other components on the texture of which comparable requirements are placed.

The invention is explained in greater detail below by reference to drawings which show embodiments. In the schematic Figures:

BRIEF DESCRIPTION OF THE SEVERAL VIEW OF THE DRAWINGS

DETAILED DESCRIPTION OF THE INVENTION

Figure 1:
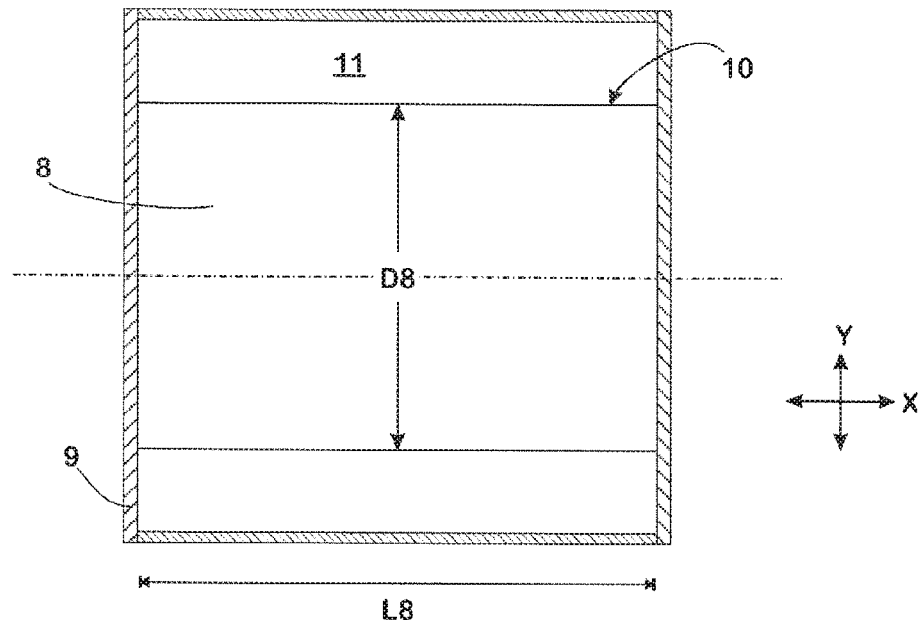
FIG. 1 is a lateral sectional view of a core portion blank which is prepared in a capsule for a hot isostatic pressing.
Figure 2:
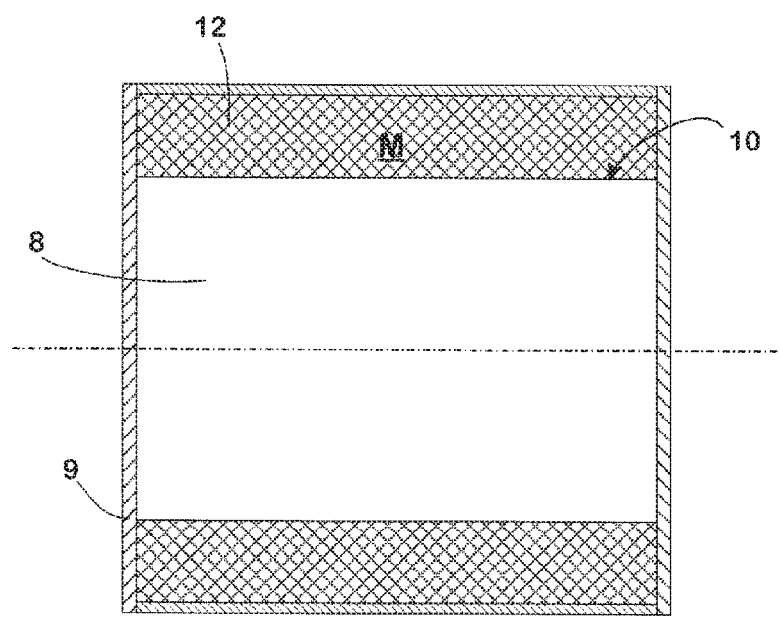
FIG. 2 is a sectional view corresponding to FIG. 1 of the core portion blank after the application of a powder material which forms a wear-resistant layer.
Figure 3:
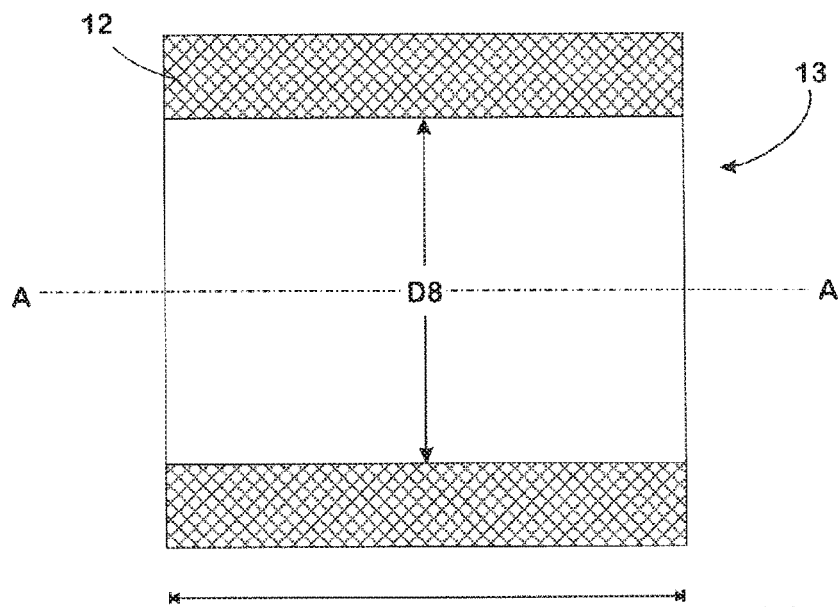
FIG. 3 is a view corresponding to FIGS. 1 and 2 of a composite body which is formed from the core portion blank and the wear-resistant material.
Figure 4:
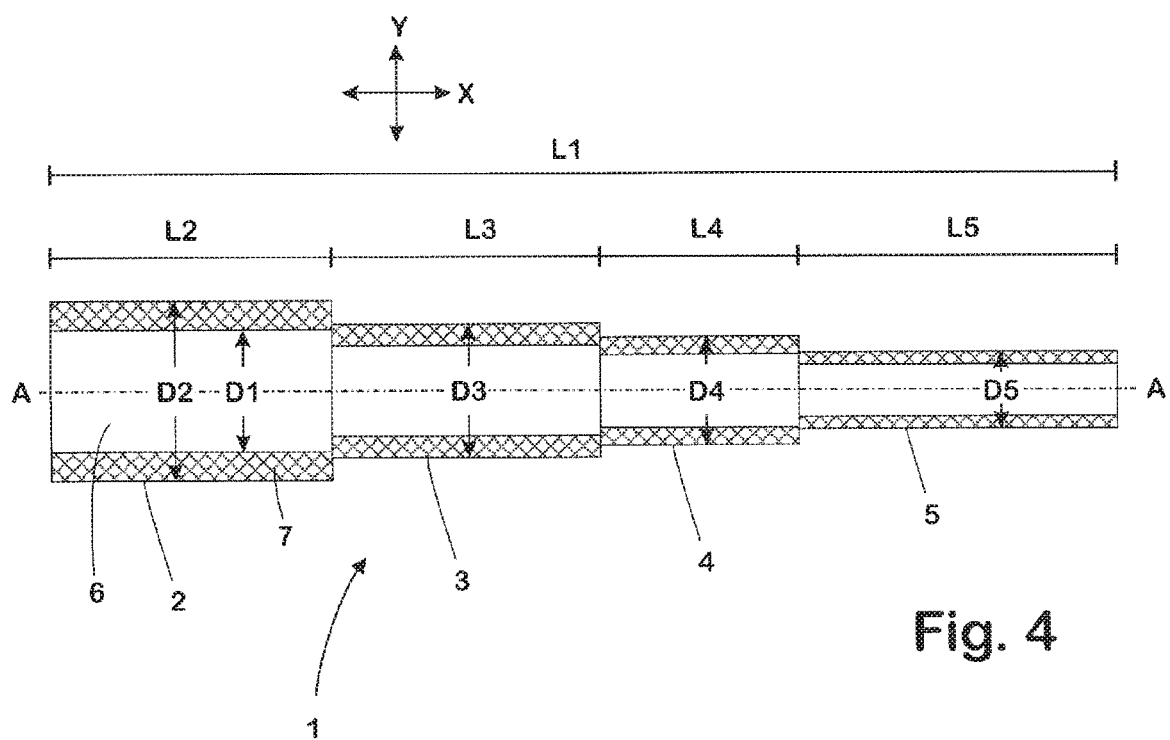
FIG. 4 is a lateral sectional view of a shaft which is formed from the composite body.
Figure 5:
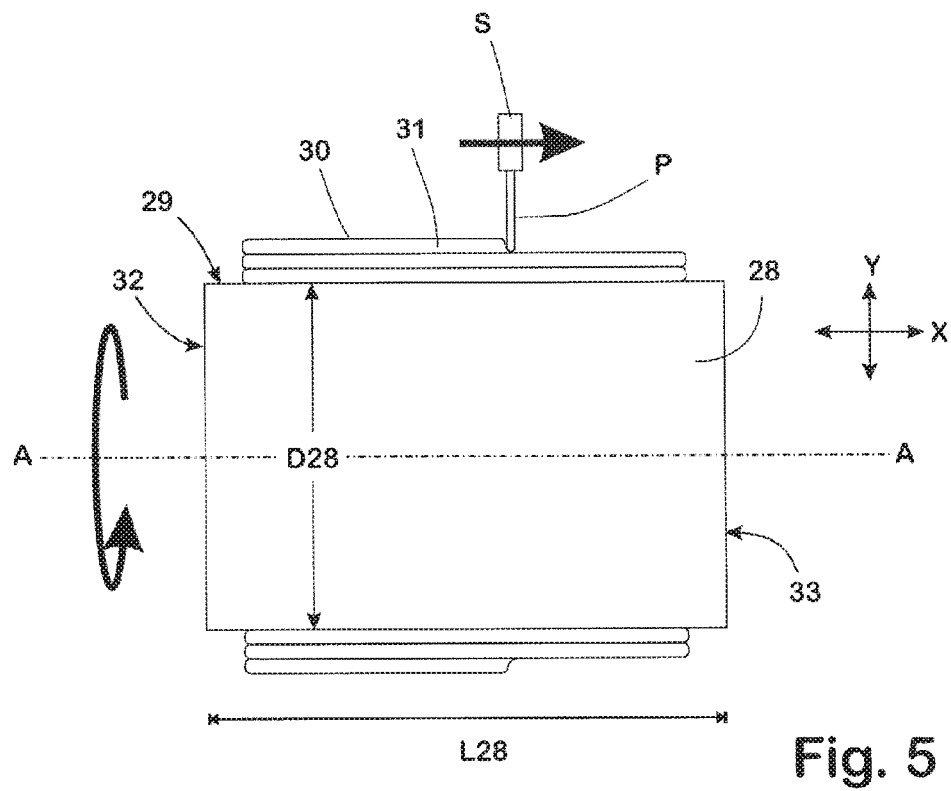
FIG. 5 is a lateral sectional view of a core portion blank during the application of a wear-resistant material by deposition welding.
Figure 6:
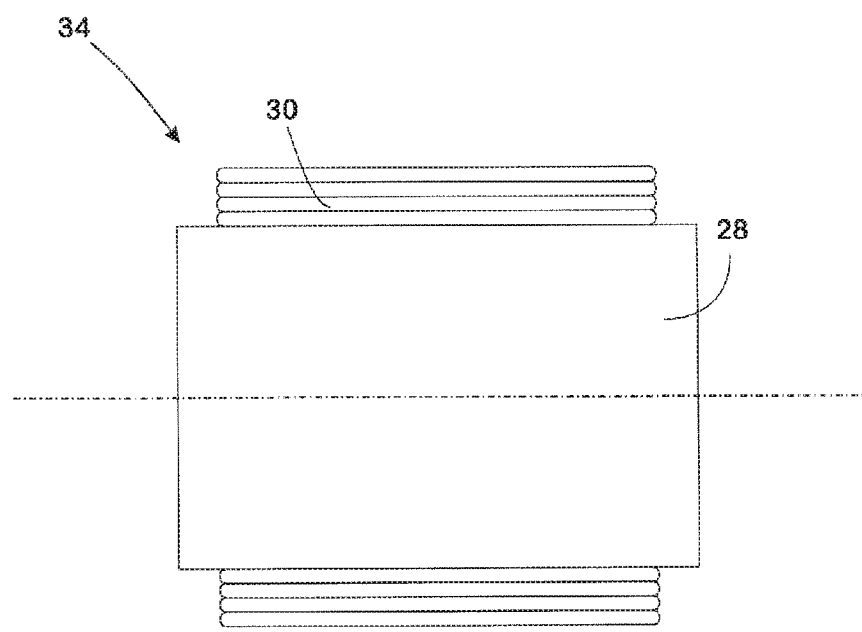
FIG. 6 is a view corresponding to FIG. 5 of the composite body which is obtained after the conclusion of the application of the wear-resistant material to the core portion blank according to FIG. 5.

An objective of a first test was to produce a shaft 1 of the type illustrated in FIG. 4. This shaft 1 has four shaft portions 2, 3, 4, 5, the diameter D2, D3, D4, D5 of which decreases from the one outer shoulder 2 as far as the other outer shoulder S of the shaft 1 in a stepped manner. At the same time, the shaft portions 2-5 have different part-lengths L2, L3, L4, L5 which are measured in the direction of the rotation axis A of the shaft 1.

The shaft 1 having the total length L1 comprises a core portion 6 which is produced from the construction steel C20 which is standardised under the material number 1.0402 and the composition of which is set out in Table 1. There is formed on the peripheral surface of the portions 2-5 of the core portion 6 a layer 7 which consists of a first variant FeCrV10' of the wear-resistant cold work steel FeCrV10 which is known per se. The composition of the material FeCrV10' of the layer 7 is also set out in Table 1.

For the production of the shaft 1, there was provided a cylindrical core portion blank 8 which consists of the steel C20 and whose length L8 which is measured in the spatial direction X which is orientated axially parallel with the rotation axis A corresponds to a fraction of the length L1 and had such dimensions that the base body could be readily placed with a capsule 9 which surrounds it in a conventional device (not shown here) for hot isostatic pressing ("HIPen"). At the same time, the diameter D8 of the core portion blank 8, which is measured in the spatial direction Y orientated perpendicularly to the spatial direction X, has such dimensions that the material volume of the core portion blank 8 corresponded to the entire material volume of the core portion 6 of the shaft 1 which is distributed over the shaft portions 2-5.

The tubular capsule 9 which surrounds the core portion blank 8 for the HIPen consisted of a steel sheet which is conventionally used for these purposes. In this case, its diameter had such dimensions that, with a coaxial orientation of core portion blank 8 and capsule 9, between the peripheral surface 10 of the core portion blank 8 and the inner surface of the capsule 9, a circumferential free space 11 was present. The end sides of the capsule 9 have been tightly closed after the positioning of the core portion blank 8 by sheet metal covers which closely abutted the end sides of the core portion blank 8.

Subsequently, an alloy powder M which consists of the material FeCrV10 and which has a grain suitable for these purposes was poured into the space 11 via a supply which is not shown here and which is provided on the capsule 9 in conventional manner so that the peripheral surface 10 of the core portion blank 8 was completely covered by alloy powder M.

Subsequently, the capsule 9 was placed in the device (not shown) for HIPen, in which the alloy powder M was densified in conventional manner at a pressure of approximately 100 MPa and temperatures of from 900 to 1200° C. and sintered to form a dense layer 12. As a result of the solid body diffusion processes which took place in this instance, a stable, materially bonded connection of the layer 12 was produced with respect to the core portion blank 8 at the same time.

After completion of the hot isostatic pressing operation, the capsule 9 was separated from the composite body 13 which was formed from the core portion blank 8 and the layer 12 which was applied thereto by the HIPen and which consists of the wear-resistant cold work steel FeCrV10.

The composite body 13 was then shaped by forging in a manner also known per se in a plurality of steps to form the shaft 1.

It was found that it was readily possible to shape a component, such as the shaft 1, from the composite body 13, the length L1 of which is considerably greater than the length L8 of the composite body 13 and the core portion blank 8 which forms the starting product for producing the shaft 1 and the diameter D2, D3, D4, D5 of which is substantially smaller than the diameter D8 of the core portion blank 8. In this case, it was also found to be readily possible to construct on the shaft 1 a journal-like shaft portion 5, the diameter D5 of which was substantially smaller than the diameter D2 of the thickest shaft portion 2 of the shaft 1.

Where necessary, the shaft 1 can be finally processed mechanically after the forging in a conclusive manner and can be subjected to a thermal processing operation in order to adjust the mechanical properties thereof.

In the finished shaft 1, the material of the core portion blank 8 of the composite body 13 forms the core portion 6 and the material M of the layer 12 of the composite body 13 forms the wear-resistant layer 7.

The above-described method of producing can accordingly be transferred readily to the production of other elongate components, such as a barrel extruder for processing plastics materials or a roller for rolling metal strips or sheets, in which comparable geometric relationships exist between the individual component portions.

Figure 7:
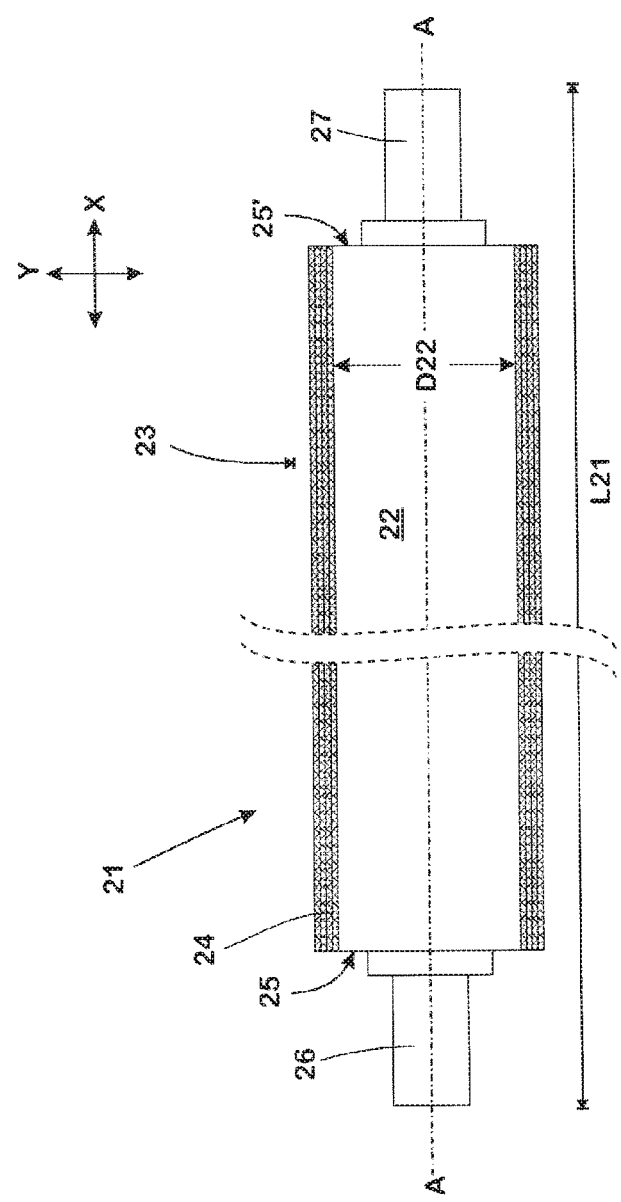
FIG. 7 is a lateral view corresponding to FIGS. 5 and 6 of a roller for rolling flat steel products.

In a second test, the roller 21 illustrated in FIG. 7 was intended to be produced and was provided as an operating roller in a roll rack for rolling steel strip. The roller 21 having a total length L21 of up to 10 m was intended to have a core portion 22 which also consists of the already above-mentioned steel C20 and a bale portion 23, at the peripheral surface of which a wear-resistant layer 24 is present. At the same time, a respective journal 26, 27 was intended to be formed on the end sides 25, 25' of the roller 21 and the roller 21 was intended to be supported therein during use.

For producing the roller 21, there was provided a cylindrical core portion blank 28 which consisted of the steel C20 and the length L28 of which similarly to the length L8 in the core portion blank 8 corresponded only to a small fraction of the length L21 of the roller 21 which was intended to be produced. At the same time, the diameter D28 of the core portion blank 28 was so much greater than the diameter D22 of the core portion 22 of the roller 21 that the material volume of the core portion blank 28 was greater by a given overdimension than the material volume taken up by the core portion 22 and the journals 26, 27. The overdimension of the material volume of the core portion blank 28 had such dimensions in this case that after the subsequently explained operating steps in the region of the journals 26, 27 which are formed from the material of the core portion blank 28, there was still available enough material volume for a machining finishing processing operation.

A layer 30 which is formed from a wear-resistant material was applied to the peripheral surface 29 of the core portion blank 28 by "Plasma Powder Deposition Welding", also referred to in technical language as "Plasma Transferred Arc Welding", abbreviated to "PTA welding".

In a first variant of the second test, the layer 30 was formed from a powder P which is present with a grain of from 63 to 160 µm and which consisted of the second variant FeCrV10" of the cold work steel FeCrV10 as set out in Table 2.

In a second test variant, a powder which consisted of the high-speed steel HSS30 and which has a grain of from 63 to 180 µm was used as the powder P. The composition of the material HSS30 which is standardised under the material number 1.3294 is also set out in Table 2.

Both the material FeCrV10 and the material HSS30 are typical representatives of materials which are conventionally used for highly wear-resistant layers which are produced by powder metallurgy of components, such as rollers and barrel extruders and which are subjected during practical use to high pressure loads or the risk of abrasive wear. The second test described here showed that both materials FeCrV10 and HSS30 used for the wear-resistant layer 24 are suitable for the purposes according to the invention to the same extent.

For the deposition welding, the core portion blank 28 is clamped on a rotating bench which is not shown here and caused to rotate. A welding torch S is in this case moved axially parallel with the rotation axis A and thus produces a plurality of layers of weld beads 31 which extend radially round the core portion blank 28 on the peripheral surface 29.

The positioning of the weld beads 31 is in this case possible in a discontinuous method, in which the advance of the welding torch S is carried out respectively after a revolution of the core portion blank 28 and adjacent annular weld beads 31 are produced, or in a continuous method, in which a continuous weld bead 31 which extends helically round the core portion blank 28 is produced respectively by the core portion blank 28 moving at the same time synchronously with respect to the continuous advance of the welding torch S.

Alternatively, however, it is also possible to produce axially extending weld beads 31 on the peripheral surface 29 respectively by the core portion blank 28 being stopped until the welding torch S has covered the length L28 of the core portion blank 28.

It should generally be noted that by repeating the deposition welding process the layer thicknesses which are required for the subsequent shaping process can be produced by the resultant multiple-layer structure. Furthermore, it is thereby also possible to produce a graduated layer structure in which different materials are welded one after the other. Thus, the properties of the steel core as far as the edge of the outer layer can be constructed with a gradient. Where necessary, scale residues or other welding residues which are present on the outer surface of the applied weld beads 31 can be removed between the individual operating steps. If a rotating bench is used to drive the core portion blank 28, it can be carried out in the same clamping composition as the deposition welding itself.

When the weld beads 31 are applied, an end portion of the peripheral surface 29 is recessed adjacent to the end sides 32, 33 of the core portion blank 28, respectively, so that at that location no wear-resistant material F is deposited.

After the deposition welding, the composite body 34 which is formed from the core portion blank 28 and the layer 30 which is applied thereto by the deposition welding was hot-shaped in a plurality of steps by forging in a manner known per se to form the roller 21. In this case, the core portion 22 of the roller 22 was formed from the core portion blank 28 of the composite body and the wear-resistant layer 24 of the roller 21 was formed from the layer 30 of the composite body.

The material volume of the core portion blank 28 not occupied with wear-resistant material P was used in the shaping for producing the journals 26, 27. Alternatively, it is naturally also possible to occupy the peripheral surface 29 of the core portion blank 28 completely with the layer 30 and to subsequently remove in a machining manner the wear-resistant layer 24 which is present in the region of the journals after the shaping of the composite body 34.

The roller 21 obtained was subjected to a thermal processing operation and subsequently processed in a machining manner in order to ensure the mechanical properties thereof and the required dimensional stability.

It should generally be noted that during the technical shaping by forging and the thermal processing the occurrences of grain coarsening and undefined thermal processing states present in the region of the thermal influence zone of the deposition welding in the core portion 22 have been eliminated. As a result of the production steps "forging" and "thermal processing", a grain refining took place in the entire composite body 34 and a defined thermal processing state was produced. In this case, the production method which is simplified with respect to the HIP process was found to be a significant advantage of the second production method which is based on deposition welding.

REFERENCE NUMERALS

1 Shaft
2-5 Shaft portions of the shaft 1
6 Core portion of the shaft 1
7 Layer comprising a wear-resistant material M
8 Core portion blank
9 Capsule
10 Peripheral surface of the core portion blank 8
11 Space in the capsule 9
12 Layer applied to the peripheral surface 10
13 Composite body
21 Roller
22 Core portion of the roller 21
23 Bale portion of the roller 21
24 Wear-resistant layer of the roller 21
25, 25' End sides of the roller 21
26, 27 Journals of the roller
28 Core portion blank
29 Peripheral surface of the core portion blank 28
30 Layer formed from a wear-resistant material on the peripheral surface 28
31 Weld beads
32, 33 End sides of the core portion blank 28
34 Composite body
A Rotation axis of the components 1, 21
D1 Diameter of the core portion of the shaft portion
D2-D5 Diameter of the shaft portions 2-5
D8 Diameter of the core portion blank 8
D28 Diameter of the core portion blank 28
D22 Diameter of the core portion 22 of the roller 21
L1 Total length of the shaft 1
L2-L5 Part-lengths L2, L3, L4, L5 of the shaft 1
L8 Length of the core portion blank 8
L21 Total length of the roller 21
L28 Length of the core portion blank
M Alloy powder
P Powder
S Welding torch
X, Y Spatial directions

TABLE 1

| Indications in % by weight, balance iron and inevitable impurities | | | | | | | | |
|---|---|---|---|---|---|---|---|---|
| | C | Si | Mn | P | S | Cr | Mo | Ni | V |
| C20 | 0.20 | <0.40 | 0.55 | <0.045 | <0.045 | <0.40 | <0.10 | <0.40 | — |
| FeCrV10' | 2.55 | 1.19 | 0.66 | 0.022 | 0.041 | 5.08 | 1.36 | 0.08 | 9.63 |

TABLE 2

| Indications in % by weight, balance iron and inevitable impurities | | | | | | | | | |
|---|---|---|---|---|---|---|---|---|---|
| | C | Si | Mn | P | S | Cr | Mo | Co | W | V |
| FeCrV10" | 2.31 | 0.85 | 0.78 | 0.016 | 0.013 | 4.25 | 1.36 | — | — | 9.9 |
| HSS30 | 1.32 | 0.46 | 0.27 | 0.017 | 0.015 | 4.07 | 5.10 | 8.29 | 6.53 | 3.10 |

The invention claimed is:

1. A method for producing a component, the component having a rotationally symmetrical shape and a core portion which is formed from a solid metal material and a wear-resistant layer which is carried by the core portion and which is present on a peripheral surface of the core portion, comprising the following operating steps:
   a) providing a core portion blank which consists of the metal material and whose dimension in a first spatial direction is greater than a desired finished dimension of the core portion of the component in the first spatial direction and whose dimension in a second spatial direction is smaller than a desired finished dimension of the core portion of the component in the second spatial direction;
   b) applying a wear-resistant material to the peripheral surface of the core portion blank to form the wear-resistant layer of the component in such a manner that the applied wear-resistant material and the core portion blank form a stable composite body, which has a composite body volume;
   c) shaping the composite body to form the component, wherein the composite body during the shaping is extended in the direction that is the same as the second spatial direction and is compressed in the direction that is the same as the first spatial direction until the dimensions of the composite body in the spatial directions at least correspond to the desired finished dimensions of the component in these spatial directions, wherein the material which forms the wear-resistant layer is present on a peripheral surface of the component, wherein the material volume of the component corresponds to the volume of the composite body;
   d) optional finishing processing of the component,
wherein the solid metal material is a construction steel, and
wherein the wear-resistant material consists of a cold work steel or a high-speed steel.

2. The method according to claim 1, wherein the core portion blank has a cylindrical shape.

3. The method according to claim 1, wherein in the operating step b), the wear-resistant material is applied in powder form to the peripheral surface of the core portion blank and is connected by means of hot isostatic pressing to the core portion blank to form the composite body.

4. The method according to claim 1, wherein in the operating step b), the wear-resistant material is applied by means of deposition welding to the peripheral surface of the core portion blank and is connected thereto to form the composite body.

5. The method according to claim 1, wherein the shaping of the composite body to form the component is carried out by means of forging.

6. The method according to claim 1, wherein the component is a roller for hot or cold rolling metal strips, further comprising forming a journal oriented coaxially relative to the core portion on each end face of the core portion.

7. The method according to claim 6, wherein in operating step b), an end portion of the peripheral surface of the core portion blank is not covered by the wear-resistant layer and in operation c), the journal is formed from the end portion of peripheral surface of the core portion blank that is not covered by the wear-resistant layer, wherein the end portion of peripheral surface of the core portion blank that is not covered by the wear-resistant layer is sized in such a manner that a volume of the end portion of peripheral surface of the core portion blank corresponds to at least a volume of the journal.

8. The method according to claim 6, wherein the journals are formed using forging technology (operating step d)).

9. The method according to claim 1, wherein the component is a shaft, roller, or a barrel extruder.

10. The method according to claim 1, wherein the shaping of the composite body in the operating step c) is carried out in such a manner that the component after the operating c) in at least one spatial direction has an overdimension with respect to the desired finished dimension of the component in the at least one spatial direction and the component in the operating step d) is subjected to a finished processing operation by means of a machining processing operation such that the dimension of the at least one spatial direction corresponds to the desired finished dimension.

* * * * *